Nov. 21, 1950 C. W. CRUMRINE 2,530,510
FILM POSITION INDICATOR FOR CAMERAS
Filed July 22, 1946 2 Sheets-Sheet 1

INVENTOR.
Chester W. Crumrine
BY Charles Shepard
his Attorney

Nov. 21, 1950 — C. W. CRUMRINE — 2,530,510
FILM POSITION INDICATOR FOR CAMERAS
Filed July 22, 1946 — 2 Sheets-Sheet 2
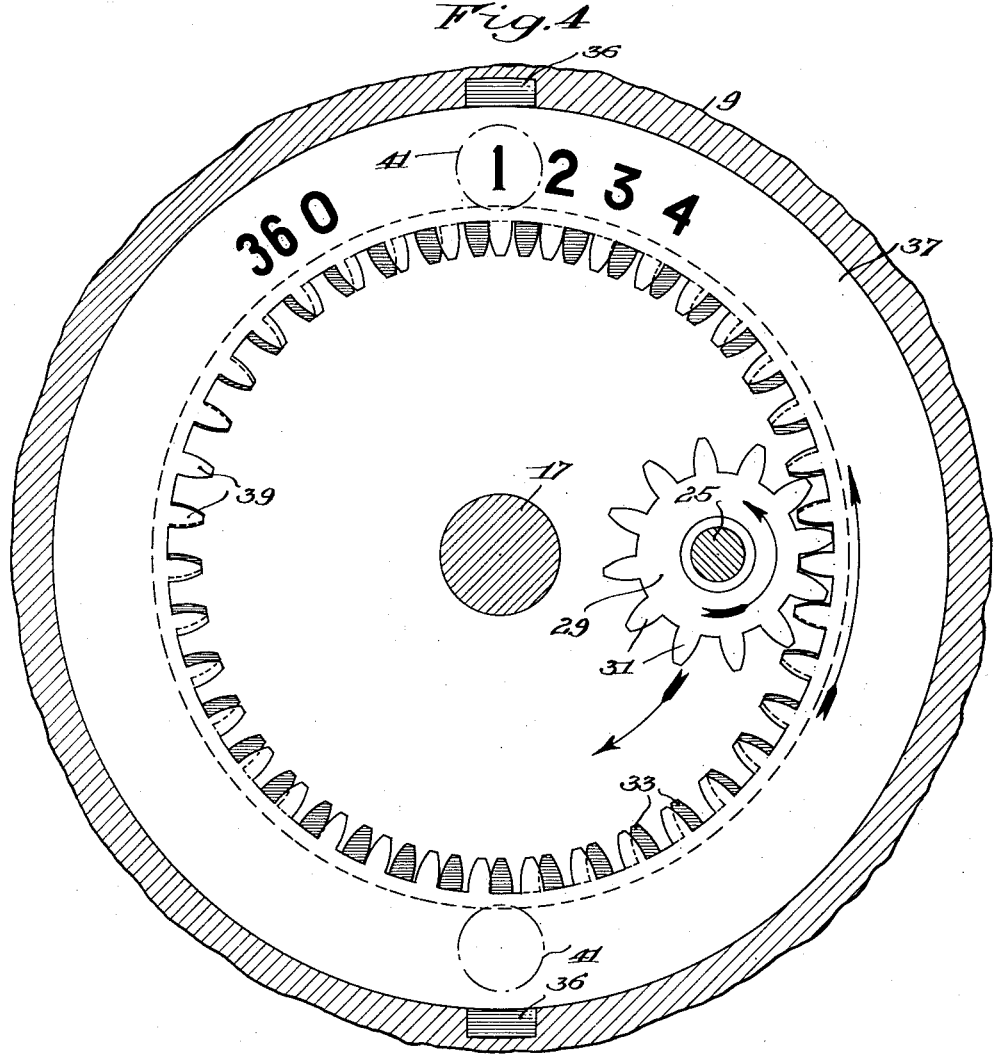
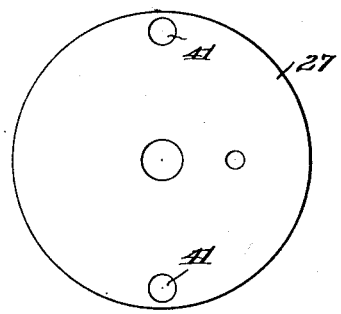
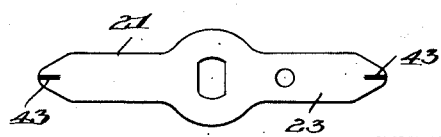
INVENTOR.
Chester W. Crumrine
BY Charles Shepard
his Attorney Patented Nov. 21, 1950

2,530,510

UNITED STATES PATENT OFFICE 2,530,510

FILM POSITION INDICATOR FOR CAMERAS

Chester W. Crumrine, Irondequoit, N. Y., assignor, by mesne assignments, to Bell & Howell Company, Chicago, Ill., a corporation of Illinois Application July 22, 1946, Serial No. 685,408

1 Claim. (Cl. 33—132)

This invention relates to cameras and particularly to cameras of the kind in which the sensitive element comprises a flexible film adapted to be moved to and from exposure position by being rolled on a spool. The present invention is particularly concerned with an indicator for showing the position of the film in the camera.

The principal object of the invention is the provision of a film indicator of this kind which is simple in construction, economical to make, and which indicates accurately the position of a film in the camera.

Another object of the invention is the provision of an indicator of this kind comprising an index member for indicating when the film has moved the exact distance required to move an unexposed portion thereof to exposure position.

Another object of the invention is the provision of an index ring having indices corresponding to the exposures to be made on a film, differential gears being provided for revolving the index ring successively through arcs corresponding to the movement of the film from one exposure position to the next.

Still another object of the invention is the provision of a simple device for indicating the position of a film in a camera, actuated by the film and comprising an index ring having indices thereon and an internal gear, a shaft adapted to be rotated by the film and having a pointer or arm fixed thereon and arranged to resiliently engage a fixed part to hold the shaft against accidental rotation, a fixed ring having an internal gear with teeth spaced closer than the teeth on the index ring and a pinion mounted eccentrically of said shaft and engaging both of said internal gears for advancing the index ring a predetermined distance when the exposed portion of the film is moved from exposure position and an unexposed section is moved into exposure position.

These and other desirable objects are accomplished by the construction disclosed as an illustrative embodiment of the invention in the following description and in the accompanying drawings forming a part hereof, in which:

Fig. 4 is an enlarged section taken substantially on the line 4—4 of Fig. 2;

Figures 5, 6:
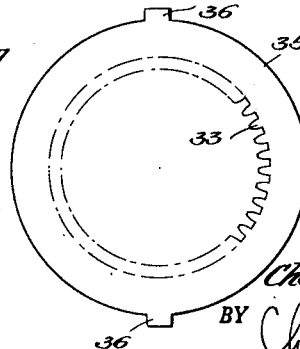
Fig. 5 is a section on the line 5—5 of Fig. 1.

Figs. 6, 7, and 8 are views of detached parts.

The same reference numerals throughout the several views indicate the same parts.

The present invention is adapted for use in a film camera of any well-known or preferred construction, and since the camera forms no part of the present invention a detailed showing and description thereof are deemed unnecessary. Such a camera comprises a case 9 in which a sensitized film 11 is moved through the focal plane of the camera to move successive sections to and from exposure position. The film is provided with a row of equally spaced openings 13 adjacent each side for engagement with well-known devices for moving the film.

In the present instance the film engages, by means of the openings 13, the teeth of a sprocket wheel 15 keyed on the inner end of a pin or shaft 17 rotatably mounted in and extending through a fixed part 19 which may be a part of the camera case. Adjacent its outer end, the shaft 17 has a pointer 21 secured thereto and shown detached in Fig. 8 of the drawings. The pointer extends radially in opposite directions from the shaft 17 to form two oppositely extending arms, one of which 23 has an inwardly extending stud 25 fixed thereto and projecting through a circular plate or disk 27, shown detached in Fig. 7 of the drawings, which rotates in a recess in the camera case. Rotatably mounted on the inner end of the stud 25 is a pinion 29 the teeth 31 of which engage teeth 33 projecting inwardly or internally from a gear or ring 35, shown in detail in Fig. 6 of the drawings, and fixed against rotation by means of diametrically opposite lugs 36 engaged with a fixed part of the camera case. An index ring gear 37 having the internal teeth 39 also meshing with the teeth of the pinion 29 is revolvably mounted in the casing in front of the ring 35 and constitutes an index wheel provided with indices in the form of numerals, as shown in Fig. 4. In the embodiment shown, the indicator is intended for use with a film having 36 exposure spaces, and the ring 37 is provided with 36 index numerals from 1 to 36, inclusive, and a zero following the numeral "36," successive numerals being arranged opposite successive ones of the gear teeth 39.

The plate 27 is coaxial with the shaft 17 and of a diameter substantially equal to the diameter of the revolvable index ring 37 so as to conceal the indices thereon and has diametrically arranged openings 41 which serve as windows for exposing the indices and through which they may be read. The ends of the pointer project over the circumference of the plate 27, at diametrically opposite points, and are provided with inwardly projecting lugs 43 adjacent their outer ends which are adapted to resiliently engage notches or detents 44 provided therefor in the frame as shown in Fig. 5. It will be noted that the walls of the notches 44 are inclined so that the lugs 43 may ride up the sides from the notches against the resiliency of the arms of the pointer. By this arrangement the shaft 17 and parts connected therewith are resiliently held from accidental rotation.

Figure 1:
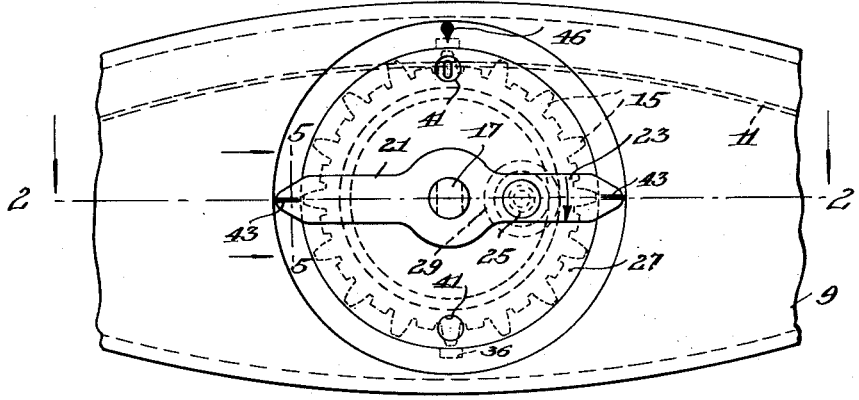
Fig. 1 is a plan view of a film position indicator mounted in a camera case, illustrating one possible embodiment of the invention, the camera case being broken away to conserve space.
Figure 2:
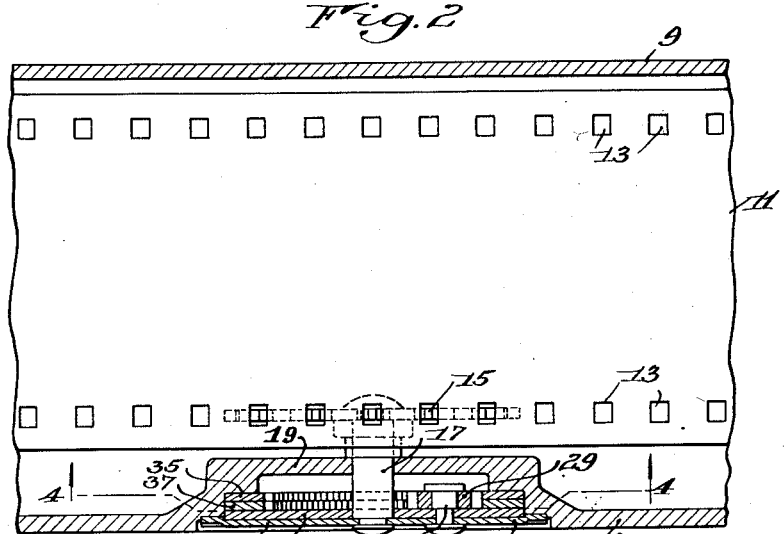
Fig. 2 is a section view taken substantially on the line 2—2 of Fig. 1.
Figure 3:
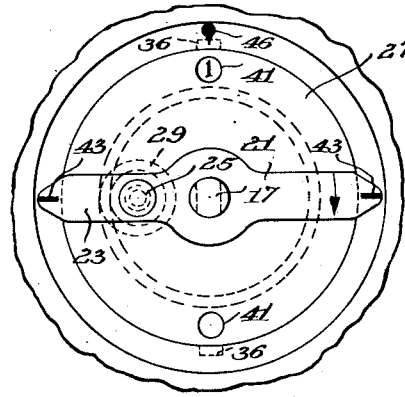
Fig. 3 is a plan view of the indicator showing parts moved from their Fig. 1 position.

The fixed gear 35, in the embodiment illustrated, has forty-one teeth, whereas the index wheel 37 has only thirty-nine teeth, one tooth corresponding to each of the 36 exposures and three extra teeth corresponding to the movement of the parts required for winding and unwinding the opaque covering for the film. Due to this difference in the number of teeth on the fixed gear 35 and the index gear 37, it follows that when the pinion 29 makes exactly one complete circuit around the teeth of the gear 35, it will cause the index gear 37 to advance by a distance of two teeth, or movement of the pinion half way around the gear 35 will cause the index gear to advance by a distance of one tooth. When the film is moved the exact distance to bring the next unexposed portion into the focal plane, the pointer makes one half of a complete revolution or turns through a semi-circle, and carries the planetary pinion and the window plate 27 with it. The lugs 43 on the arms of the pointer are disengaged from their detents and reengaged when the pointer completes one half revolution, during which an exposed portion of the film is moved from and an unexposed portion is moved into the focal plane, the resilient engagement of the lugs 43 in their notches tending to stop the movement of the film when the new or unexposed portion is in exact exposure position. The index gear is also advanced one tooth to bring the next successive index numeral into registration with a pointer 46 on the case, when the other opening 41 simultaneously registers with the index. The openings 41 are diametrically opposite each other and substantially 90° from the pointer 21. It will be noted that the numerals on the index ring indicate the number of exposures on the film, while the detents on the pointers definitely indicate that the new portion of the film is in exposure position and tend to retain it from accidental movement from such position. This movement of the film also rotates the plate 27 and imparts a planetary movement to the pinion 29 also connected with the pointer. The pointer 21 and with it the pinion 29 turn in the direction indicated by the arrows in Figs. 1 and 4. The revolving pinion is rotated on its axis by its engagement with the fixed gear 35 and revolves the index gear in a counterclockwise direction indicated by the arrow in Fig. 4. In the embodiment illustrated, the relation of the teeth on the two gears is such that the index gear is advanced one tooth to move the next succeeding index numeral into registration with the pointer 46 and the opening 41 simultaneously into registration with said index numeral to expose the same. After the thirty-sixth exposure has been completed, the next feeding or winding movement of the film causes the "0" to appear at the sight window, and then there are two blank spaces for two more feeding movements before the numeral "1" appears at the window, these two feeding movements being used in taking out the completely exposed roll of film and in inserting a fresh roll.

In the present embodiment the parts are shown mounted in a cup-shaped depression provided therefor in the case of the camera, so that they are practically flush with its outer wall and are protected from accidental injury.

The embodiment of the invention illustrated, is particularly adapted for use with a camera using a film having thirty-six exposures thereon; however, the invention is not limited to such use but may be applied to any camera using flexible film with any number of exposures, by suitably changing the number of teeth on the gears 35 and 37 and the spacing of the index numerals.

It is seen from the foregoing disclosure that a construction is provided which admirably fulfills the above-mentioned objects of the invention. It is to be understood that the foregoing disclosure is given by way of illustrative example only, rather than by way of limitation, and that without departing from the invention, the construction may be varied within the scope of the appended claim.

What is claimed is:

A photographic camera of the type employing film having a longitudinally extending series of perforations near one edge, said camera comprising a case having a recess in one face, a sprocket wheel having teeth engaging in said perforations so that movement of said film rotates said sprocket wheel, a shaft driven by said sprocket wheel and extending into said recess, a face plate covering and closing the outer open end of said recess, said face plate being mounted on said shaft to rotate therewith, a plurality of symmetrically spaced apertures extending through said face plate near the outer edge thereof, a fixed internal gear in said recess, a rotatable internal gear in said recess interposed between said fixed gear and said face plate and carrying a series of film position identifying numerals selectively visible through one or another of said apertures in said face plate, said rotatable gear having a number of teeth different from that of said fixed gear, a stud fixed relative to and projecting inwardly beyond the inner face of said face plate, and a pinion rotatably mounted on said stud and meshing with both of said gears so that it rolls on said fixed gear and drives said rotatable gear as said shaft and said face plate are turned, to cause successive numerals on said rotatable gear to appear through said apertures in said face plate as said sprocket and shaft are turned by advancing movement of said film.

CHESTER W. CRUMRINE.

REFERENCES CITED

The following references are of record in the file of this patent:

UNITED STATES PATENTS

| Number | Name | Date |
|---|---|---|
| 188,738 | Heckert | Mar. 27, 1877 |
| 810,444 | Theil | Jan. 23, 1906 |
| 1,760,938 | Edgar | June 3, 1930 |
| 1,966,707 | Buck | July 17, 1934 |
| 2,273,956 | Hall | Feb. 24, 1942 |
| 2,289,827 | Crumrine | July 14, 1942 |
| 2,298,349 | Crumrine | Oct. 13, 1942 |
| 2,406,366 | Graef | Aug. 27, 1946 |

FOREIGN PATENTS

| Number | Country | Date |
|---|---|---|
| 6,835 | Great Britain | Apr. 3, 1895 |
| 824,546 | France | Feb. 10, 1938 |